United States Patent
Le Gall et al.

(10) Patent No.: US 7,732,541 B2
(45) Date of Patent: Jun. 8, 2010

(54) POLYMERS COMPRISING IN THEIR SKELETON AN ENDO ETHYLENIC UNSATURATION, AND PREPARATION PROCESSES THEREFOR

(75) Inventors: Thierry Le Gall, Gif-sur-Yvette (FR); Jean-Philippe Goddard, Boulogne (FR); Charles Mioskowski, Strasbourg (FR)

(73) Assignees: Commissariat a l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 1271 days.

(21) Appl. No.: 10/530,802

(22) PCT Filed: Oct. 10, 2003

(86) PCT No.: PCT/FR03/02995

§ 371 (c)(1), (2), (4) Date: Sep. 2, 2005

(87) PCT Pub. No.: WO2004/033524

PCT Pub. Date: Apr. 22, 2004

(65) Prior Publication Data

US 2006/0058475 A1    Mar. 16, 2006

(30) Foreign Application Priority Data

Oct. 11, 2002  (FR)  .................................. 02 12672

(51) Int. Cl.
*C08F 4/44* (2006.01)
(52) U.S. Cl. ...................... 526/133; 526/134; 526/239; 526/240; 526/348
(58) Field of Classification Search ................. 526/133, 526/134, 239, 240, 348
See application file for complete search history.

(56) References Cited

U.S. PATENT DOCUMENTS

| 4,097,509 A | * | 6/1978 | Schmidbaur et al. .......... 556/18 |
| 4,567,244 A | | 1/1986 | Grubbs et al. |
| 5,476,915 A | * | 12/1995 | Shea et al. .................... 528/4 |
| 5,731,383 A | | 3/1998 | Nubel et al. |

FOREIGN PATENT DOCUMENTS

| EP | 0 694 575 A1 * | 1/1996 |
| EP | 0694575 | 1/1996 |
| GB | 1043485 | 9/1966 |

* cited by examiner

*Primary Examiner*—Robert D. Harlan
(74) *Attorney, Agent, or Firm*—Brinks, Hofer, Gilson & Lione

(57) ABSTRACT

The invention relates to polymers comprising a sequence of units comprising an ethylenic unsaturation, the unsaturation being located every 3 carbon atoms between two successive units.

The invention also relates to processes for preparing such polymers.

10 Claims, No Drawings

POLYMERS COMPRISING IN THEIR SKELETON AN ENDO ETHYLENIC UNSATURATION, AND PREPARATION PROCESSES THEREFOR

TECHNICAL FIELD

The present invention relates to novel polymers comprising in their skeleton an endo ethylenic unsaturation, and also to a process for manufacturing such polymers.

PRIOR ART

Polymers containing an Endo ethylenic unsaturation, which are generally synthesized from monomers containing two conjugated double bonds in their skeleton, are often referred to by the general term "diene polymers".

Among the diene polymers that are the most common, mention may be made of rubber, also known as polyisoprene, this polymer consisting of a cis repeating unit having the following formula:

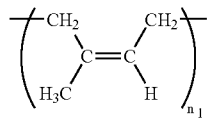

$n_1$ corresponding to the number of repeating units present in the said polymer.

It is harvested from rubber tree sap or may be obtained synthetically from isoprene via a Ziegler-Natta polymerization.

A diene polymer of structure similar to that of rubber is polybutadiene, obtained from butadiene also by Ziegler-Natta polymerization.

Butadiene also forms part of the constitution of the copolymer poly(styrene-butadiene-styrene), which is more commonly known by the abbreviation SBS or the trivial name hard rubber. This copolymer is a block copolymer successively comprising a long polystyrene chain, a long polybutadiene chain and again a long polystyrene chain. This copolymer especially forms part of the constitution of shoe soles and tyres.

Without being exhaustive, another diene polymer that may also be mentioned is polychloroprene, more commonly known under the name Neoprene. This polymer is obtained synthetically by polymerization of chloroprene, of formula $CH_2=CCl-CH=CH_2$.

DESCRIPTION OF THE INVENTION

The aim of the present invention is to propose novel polymers comprising in their skeleton an Endo ethylenic unsaturation, and also processes for preparing these polymers that are simple to perform.

Thus, one subject of the invention is novel polymers whose skeleton comprises a sequence of units, the said units being identical or different and corresponding to formula (I) below:

in which:

$R_1$ represents a hydrogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;

$R_2$ represents a halogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;

the radicals $R_3$ and $R_4$, which may be identical or different, correspond to the same definition as $R_1$, on condition that at least one of the radicals $R_3$ and $R_4$ represents, within each unit, a hydrogen atom;

the said radicals $R_1$, $R_2$, $R_3$ and $R_4$ possibly comprising, when they represent a hydrocarbon-based group, one or more substituents chosen from halogen groups, alkyl groups of 1 to 20 carbon atoms, alkoxy groups of 1 to 20 carbon atoms, aryl groups of 6 to 20 carbon atoms, aryloxy groups of 6 to 20 carbon atoms and amino groups.

It is pointed out that, according to the invention, the term "amino group" means a primary, secondary (or monosubstituted) or tertiary (or disubstituted) amine group. The possible substituents may be alkyl groups.

The polymers according to the invention comprise in each unit of formula (I) an endo ethylenic unsaturation, this endo ethylenic unsaturation being located between two consecutive units of formula (I), all three being carbon atoms.

Thus, by virtue of this arrangement, these polymers may have higher rigidity than that of their diene analogues (i.e. those having a sequence of units with an ethylenic unsaturation every four carbon atoms between two adjacent units).

These polymers may correspond to any type of polymer comprising a sequence of units of formula (I). It is pointed out that the term "sequence" means the conjunction of at least two consecutive units of formula (I), preferably at least 4 and even more preferably at least 10.

More specifically, these polymers may correspond to polymers whose skeleton consists solely (with the exception of the end units) of units of formula (I), these units possibly being identical or different. It is noted that the units of formula (I) may be different, which is the case when $R_1$, $R_2$, $R_3$ and $R_4$ are different from one unit to the other. These polymers may also correspond to polymers whose skeleton consists partly of units of formula (I) and of other units, for example units derived from the units of formula (I), such as diol units.

According to the invention, the sequence of units of formula (I) may comprise at least one group chosen from the group consisting of C=O, C=NOH or CHOH, and linear or branched alkylenediyl groups containing from 4 to 20 carbon atoms, and mixtures thereof. In other words, in the sequence of units (I), the groups as defined above may interconnect between two units (I) of the sequence.

Preferably, the polymers of the invention have a molar mass of from 500 g/mol to 2 000 000 g/mol.

Particular polymers that fall within the general definition of the present invention correspond to formula (II) below:

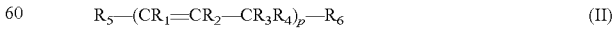

in which the radicals $R_1$, $R_2$, $R_3$ and $R_4$ are as defined above, $R_5$ represents a linear or branched alkyl group containing from 1 to 20 carbon atoms, a cycloalkyl group containing from 3 to 20 carbon atoms or an aryl group containing from 6 to 20 carbon atoms, $R_6$ represents an —OH, primary amine, thiol —SH, halogen or —CHO group, a group derived from —CHO, an ester group, an optionally substituted amide group or an azide group —$N_3$, and p is an integer ranging from 4 to 10 000.

According to the invention, the term "optionally substituted amide" means, in the text hereinabove and hereinbelow, a primary (or unsubstituted) amide, a secondary (or monosubstituted) amide or a tertiary (or disubstituted) amide. The possible substituents may be alkyl groups.

The term "—CHO derivative" means, in the text hereinabove and hereinbelow, a group resulting from a nucleophilic addition of a nucleophilic reagent to —CHO, such as an imine, oxime or hydrazine group.

In formula (II), $R_1$, $R_3$ and $R_4$ are as defined for the unit of formula (I) and may be identical. As an example of a radical $R_1$, $R_3$ and $R_4$ that may be used, mention may be made, for example, of hydrogen.

In formula (II), $R_2$ may be a linear alkyl group containing from 1 to 20 carbon atoms, such as a methyl group, and $R_5$ may be a linear alkyl group containing from 1 to 4 carbon atoms, such as a butyl group.

When $R_1$, $R_3$ and $R_4$ represent H, $R_2$ represents —$CH_3$, and $R_5$ represents a butyl group $CH_3$—$(CH_2)_3$— (referred to as Bu in the formula below) and $R_6$ represents —OH, the polymer corresponds to formula (III) below:

$$\text{Bu-(CH=CCH}_3\text{—CH}_2)_p\text{—OH} \quad (III)$$

with p corresponding to the same definition as that given above.

Another particular polymer in accordance with the present invention may correspond to the following formula:

$$R_5\text{—(CR}_1\text{=CR}_2\text{—CR}_3R_4)_{p1}$$
$$R_5\text{—(CR}_1\text{=CR}_2\text{—CR}_3R_4)_{p2}\text{—C—OH}$$
$$R_5\text{—(CR}_1\text{=CR}_2\text{—CR}_3R_4)_{p3}$$

the radicals $R_5$, which may be identical or different, corresponding to the same definition as that given above, and the $p_1$, p2 and p3, which may be identical or different, being integers ranging from 2 to 5000.

Further particular polymers in accordance with the present invention correspond to formula (IV) below:

$$R_7\text{—(CR}_1\text{=CR}_2\text{—CR}_3R_4)_m\text{-A-(CR}_3R_4\text{—CR}_2\text{=CR}_1)_n\text{—R}_8 \quad (IV)$$

in which the radicals $R_1$, $R_2$, $R_3$ and $R_4$ are as defined above, A represents a C=O group, a CO derivative or —CHOH, and the radicals $R_7$ and $R_8$, which may be identical or different, represent a linear or branched alkyl group containing from 1 to 20 carbon atoms, a cycloalkyl group containing from 3 to 20 carbon atoms or an aryl group containing from 6 to 20 carbon atoms, m is an integer ranging from 2 to 5000 and n is an integer ranging from 2 to 5000.

The term "C=O group" means, in the text hereinabove or hereinbelow, a group resulting from a nucleophilic addition of a nucleophilic reagent to —C=O, such as an imine, oxime or hydrazine group.

The polymers of formula (IV) are therefore linear polymers whose sequence of units (I) comprises a group A as defined above.

In formula (IV), the group A may represent —(C=O)—, in which case the corresponding polymer corresponds to formula (V) below:

$$R_7\text{—(CR}_1\text{=CR}_2\text{—CR}_3R_4)_m\text{—(C=O)—(CR}_3R_4\text{—CR}_2\text{=CR}_1)_n\text{—R}_8 \quad (V)$$

When $R_1$, $R_3$ and $R_4$ represent H, $R_2$ represents a methyl group and $R_7$ and $R_8$ correspond to a linear butyl group (referred to as Bu in the above formula), the polymer corresponds to formula (VI) below:

$$\text{Bu-(CH=CCH}_3\text{—CH}_2)_m\text{—(C=O)—(CH}_2\text{—CCH}_3\text{=CH})_n\text{-Bu} \quad (VI)$$

with m and n corresponding to the same definition as that given above.

Finally, among the polymers in accordance with the present invention, examples that may be mentioned include the polymers corresponding to formula (VII) below:

$$D\begin{cases}(CR_1=CR_2-CR_3R_4)_m-R_9 \\ (CR_1=CR_2-CR_3R_4)_n-R_{10}\end{cases} \quad (VII)$$

in which:
the radicals $R_1$, $R_2$, $R_3$ and $R_4$ correspond to the same definition as that given above;
the radicals $R_9$ and $R_{10}$, which may be identical or different, represent an OH, $NH_2$, SH, optionally substituted amide or —CHO group, a group derived from —CHO, an ester group, an optionally substituted amide group or an azide group —$N_3$; or $R_9$ and $R_{10}$ together form a —C(=O)— group, a group derived from CO or a —CHOH— group;
D represents a linear or branched alkylenediyl group containing from 4 to 20 carbon atoms, possibly comprising in its chain one or more heteroatoms chosen from oxygen, sulfur and nitrogen,
m is an integer ranging from 2 to 5000 and n is an integer ranging from 2 to 5000.

The polymers of formula (VII) may correspond to linear polymers whose sequence of units of formula (I) comprises a group D but may also correspond to cyclic polymers whose sequence of units comprises a group D and a —C(=O)—, CHOH or —C(NOH)— group.

In formula (VII) above, the polymer may correspond, as stated previously, to a cyclic polymer, which is the case when the groups $R_9$ and $R_{10}$ together form a —(C=O)-group and D a linear or branched alkylenediyl group ranging from 4 to 20 carbon atoms, this polymer thus corresponding to formula (VIII) below:

$$D\begin{cases}(CR_1=CR_2-CR_3R_4)_m \\ (CR_1=CR_2-CR_3R_4)_n\end{cases}=O \quad (VIII)$$

In the particular case where $R_1$, $R_3$ and $R_4$ represent H, $R_2$ represents a methyl group and D an alkylene group —$(CH_2)_6$—, the polymer corresponds to formula (IX) below:

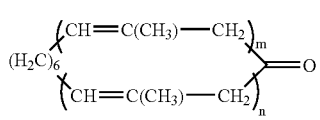
(IX)

m and n corresponding to the same definition as that given above.

The groups $R_9$ and $R_{10}$ may also both represent the same groups, in which case the polymer in question is a linear polymer with two identical ends. A particular example of this type of polymer is a polymer in which $R_9$ and $R_{10}$ both represent, for example, groups —OH and D represents a linear or branched alkylene group, in which case the corresponding polymer is a linear polymer corresponding to formula (X) below:

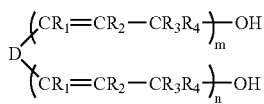
(X)

When D corresponds to a linear alkylene group containing 6 carbon atoms, the polymer corresponds to formula (XI) below:

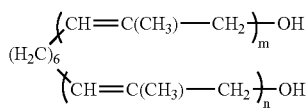
(XI)

According to the invention, the endo ethylenic unsaturation of the units in accordance with the present invention may predominantly have E geometry, the resulting polymer thus having E stereochemistry of the double bonds.

A subject of the present invention is also processes for preparing polymers comprising a sequence of units, the said sequence containing an ethylenic unsaturation every 3 carbon atoms.

In general, a subject of the invention is a process for preparing a polymer whose skeleton comprises a sequence of units of formula (I'):

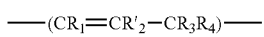
(I')

the radicals $R_1$, $R_3$ and $R_4$ corresponding to the same definition as that given above, $R'_2$ corresponding to the same definition as $R_2$ and possibly also representing a hydrogen, the said process comprising a step consisting in reacting, in suitable amount:

at least one compound of ylide type corresponding to formula (2) below:

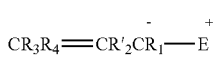
(2)

in which the radicals $R_1$, $R'_2$, $R_3$ and $R_4$ correspond to the same definition as that given above, E being a leaving group, with a trivalent boron compound, comprising at least one group capable of migrating, so as to obtain the said sequence of units of formula (I') as defined above.

The term "trivalent boron compound" means a boron-based group bearing three groups. The term "group capable of migrating" means a group capable of moving from the boron atom to an adjacent carbon atom by displacement of the bond, under the reaction conditions.

Preferably, the group capable of migrating formed by the boron compound may be chosen from linear or branched alkyl groups containing from 1 to 20 carbon atoms, with the exception of branched alkyl groups linked to the boron via a tertiary carbon.

Preferably, the leaving group E may be chosen from $N_2$, $S(R)_2$, $S(O)(R)_2$, $N(R)_3$, $AsAr_3$ and $PAr_3$, in which Ar represents a phenyl group optionally substituted with methyl or methoxy groups and R is an alkyl group, such as an alkyl group containing from 1 to 20 carbon atoms.

In particular, the compound of ylide type may be methallyltriphenylarsonium ylide of formula:

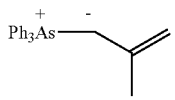

This ylide especially has the advantage of being easy to prepare.

Thus, the formation of the sequence of units of formula (I') according to the invention is based, surprisingly, on the following reaction characteristics:

by virtue of the electron deficiency of the boron atom, the boron compound is capable of receiving the negative charge borne by the carbon atom bearing the group $R_1$, to form a complex;

the complex thus obtained is unstable, due to the fact that the boron compound forming the complex with the ylide compound bears an excess of negative charge and rearranges by 1,2 migration of one of the groups (or of the group, if there is only one) capable of migrating from the boron compound to the carbon bearing $R_1$, thus resulting in the concomitant loss of the leaving group E;

the borane compound thus formed rearranges, surprisingly, according to a 1,3 sigmatropic rearrangement, whereas this compound would have been expected to react with another ylide compound. This rearrangement is characterized by the displacement of the boron-based group and, concomitantly, by a displacement of the double bond between the carbon atom bearing $R_1$ and the carbon atom bearing the migrating group initially borne by the boron-based compound;

the borane compound resulting from the sigmatropic rearrangement may once again form a complex by addition to a new ylide molecule, followed by a new 1,2 migration and a 1-3 rearrangement, the reaction possibly continuing until the stock of ylide has been depleted.

Sequences of units (I') characterized by the presence of an ethylenic unsaturation every 3 carbon atoms are thus obtained after these steps.

It is understood that the proportions of ylide and of initial boron compound may be readily determined by a person skilled in the art, as a function of the desired sequence length and of the size of the desired polymer.

It is noted that, starting with one equivalent of boron compound, the same amount of desired units may be obtained by adding to this equivalent of boron compound the same equivalent of ylide and of desired units.

More precise reaction mechanisms are proposed hereinbelow, concerning the process for preparing particular polymers in accordance with the invention.

In detail, the implementation of the process according to the invention begins with the formation of the ylide compound in an apolar aprotic solvent, such as anhydrous THF. The ylide compound is prepared by proceeding via a diazonium intermediate, to which is added a base. The diazonium intermediate is prepared via usual methods available to those skilled in the art. The boron compound is then introduced and, finally, the compound of ylide type is added, preferably dropwise.

The invention relates in particular to a process for preparing a polymer of formula (II') below:

$$R_5-(CR_1=CR'_2-CR_3R_4)_p-R_6 \qquad (II')$$

comprising a step of reacting, in suitable amount, a boron compound of formula (1) $R_5-BR_{11}R_{12}$ with $R_5$ having the same definition as that given above and representing the group capable of migrating, $R_{11}$ and $R_{12}$, which may be identical or different, possibly:

- representing a branched alkyl group linked to the boron via a tertiary carbon containing from 4 to 20 carbon atoms, an alkoxy group containing from 1 to 20 carbon atoms or an aryloxy group containing from 1 to 20 carbon atoms; or
- together forming a group —O—X—O—, in which X is a linear or branched alkylenediyl group containing from 2 to 6 carbon atoms with at least one allylic nucleophilic compound of the ylide type of formula (2) as defined above, by means of which an intermediate of formula (XII) below is obtained:

$$R_5-(CR_1=CR'_2-CR_3R_4)_p-BR_{11}R_{12} \qquad (XII)$$

the said process also comprising a step of converting the boron-based group into a suitable group $R_6$, by means of which the polymer of formula (II') defined above is obtained.

It is noted that, for this process, the boron compound comprises only one group capable of migrating (group $R_5$), the groups $R_{11}$ and $R_{12}$, by their nature, being incapable of migration.

Examples of particular boron compounds that may be mentioned include the compounds having the following formulae:

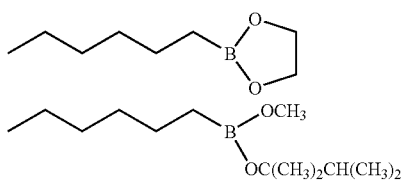

In order to make the description clearer, this implementation process will now be described by means of a reaction mechanism, comprising the following steps in the first step, the boron compound $R_5-BR_{11}R_{12}$ (1) reacts with the allylic nucleophilic compound (2), leading to a complex (3), which spontaneously rearranges via a migration of 1,2 type of the group $R_5$, to give an intermediate compound (4):

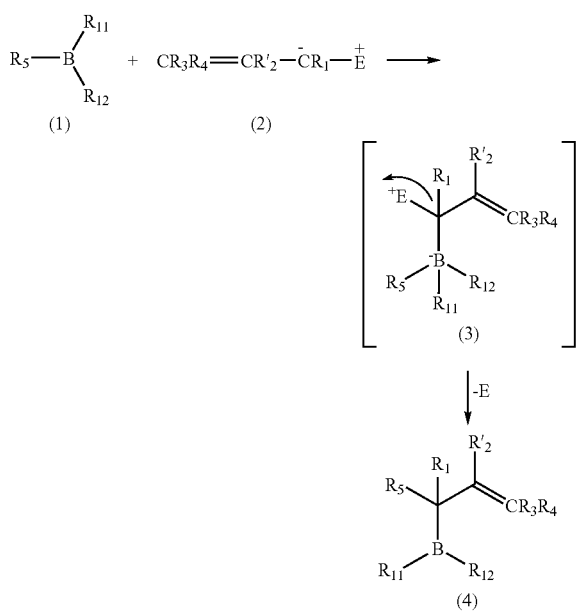

The intermediate compound (4) differs from the initial boron compound (1) by the fact that a unit $(CR_3R_4=CR_2)-CR_1$ has become inserted into the boron-carbon bond $B-R_5$.

in a second stage, the intermediate compound (4) rearranges again via a 1,3-sigmatropic rearrangement mechanism according to the following scheme:

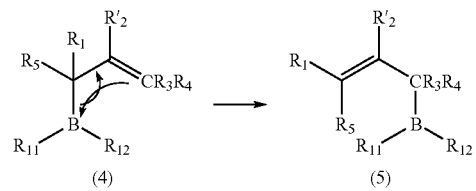

This second rearrangement is faster than the intermediate reaction (4) with the allylic nucleophilic compound of ylide type (2).

The borane compound (5) obtained during this second step can participate in a new polymerization step to give, after reaction with several equivalents of ylides, the polymer having the following formula:

$$R_5-(CR_1=CR'_2-CR_3R_4)_p-BR_{11}R_{12} \qquad (XII)$$

Finally, the last step consists in converting, by reaction with a suitable reagent, the group $BR_{11}R_{12}$ into a suitable group $R_6$.

By way of examples, for converting the group $-BR_{11}R_{12}$ into an —OH group, the polymer of formula (XII) may be subjected to an oxidizing solution of hydrogen peroxide $H_2O_2$ in basic medium (for example 3M NaOH). Other oxidizing agents commonly used are m-chloroperbenzoic acid and triethylamine oxide.

To convert the group $-BR_{11}R_{12}$ into an $-NH_2$ group, the polymer of formula (XII) may be subjected to a solution of hydroxylamine-O-sulfonic acid $NH_2-O-SO_3H$ or of chloramine $NH_2Cl$ in basic medium.

Finally, to convert the group $-BR_{11}R_{12}$ into a $-CHO$ group, given that the radicals $R_{11}$ and $R_{12}$ represent alkoxy groups, the polymer of formula (XII) may be subjected to an organolithium reagent, for example methoxymethyl thiophenyl ether, followed by a treatment with mercuric chloride ($HgCl_2$) and a treatment with aqueous hydrogen peroxide solution in basic medium.

Via this process, polymers with an end $R_5$ derived from the starting boron compound and an end $R_6$ resulting from the chemical conversion of the group $BR_{11}R_{12}$.

According to one variant of the invention, the process for preparing a polymer of formula (II) below:

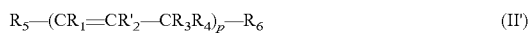

(II')

comprises a step of reacting, in suitable amount, a boron compound of formula $(R_5)_3-B$ with $R_5$ having the same definition as that given above, with at least one allylic nucleophilic compound of the ylide type of formula (2) as defined above, by means of which an intermediate of formula (XIII) below is obtained:

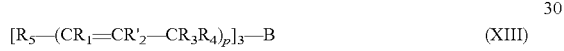

(XIII)

the said process also comprising a step of converting the boron-based group into a suitable group $R_6$, by means of which the polymer of formula (II') defined above is obtained.

The reactions for conversion of the intermediate compound (XIII) into the polymer (II) are similar to those described for the conversion of the intermediate compound (XII).

In particular, a boron compound that may be used is the compound $Bu_3B$ (Bu corresponding to the linear butyl group), and a nucleophilic compound of ylide type that may be used is methallyltriphenylarsonium ylide for which E corresponds to a $Ph_3As$ group, by means of which the polymer of formula (III) defined above is obtained, after a final step of conversion, by treatment with aqueous hydrogen peroxide solution in basic medium.

A process for preparing according to the invention a particular polymer corresponding to the following formula:

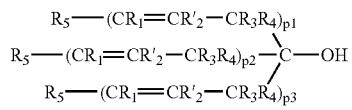

the radicals $R_5$, which may be identical or different, corresponding to the same definition as that given above, and $p_1$, $p_2$ and $p_3$, which may be identical or different, being integers ranging from 2 to 5000, comprises a step of reacting, in suitable amount, a boron compound of formula:

$(R_5)_3-B$ with at least one allylic nucleophilic compound of the ylide type of formula (2) as defined above, by means of which an intermediate of formula (XIV) below is obtained:

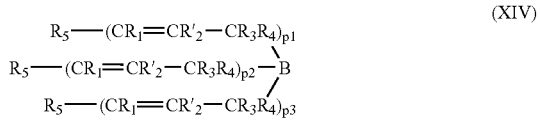

(XIV)

the said process also comprising a step of converting the boron-based group into a C—OH group by treatment of the intermediate compound (XIV) by heating in the presence of carbon monoxide, preferably at 150° C. in the presence of ethylene glycol, followed by a treatment with aqueous hydrogen peroxide solution in basic medium.

The invention also relates to a process for preparing a particular polymer in accordance with the invention, the said polymer corresponding to formula (IV') below:

(IV')

with $R_1$, $R'_2$, $R_3$, $R_4$, $R_7$, $R_8$, A, m and n having the same definition as that given above, the said process comprising the reaction:

of a boron compound of formula (6) $R_7-BR_8R_{13}$ with $R_7$ and $R_8$ having the same definition as that given above, $R_{13}$ being a branched alkyl group linked to the boron via a tertiary carbon containing from 4 to 20 carbon atoms, or an alkoxy or aryloxy group containing from 1 to 20 carbon atoms;

with at least one allylic nucleophilic compound of the ylide type of formula (2):

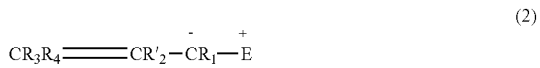

(2)

as defined above, in order to obtain a derivative of formula (XV):

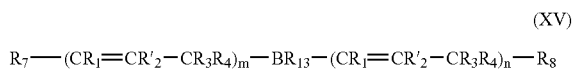

(XV)

followed by a reaction for conversion of the group $BR_{13}$ into a suitable group A.

Examples of boron compounds that may be mentioned include the particular compounds corresponding to the following formulae:

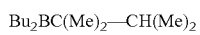

$Bu_2BC(Me)_2-CH(Me)_2$

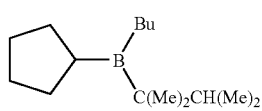

Bu corresponding to the linear butyl group.

For example, to go from the function $BR_{13}$ to CO, the following treatments may be applied:
- treatment with carbon monoxide, in the presence of water, at a pressure, for example, of 100 bar and a temperature of at least 70° C.;
- treatment with NaCN in the presence of $(CF_3CO)_2O$, followed by a treatment with aqueous hydrogen peroxide solution in basic medium;
- if $R_{13}$ represents an alkoxy group, treatment with dichloromethyl methyl ether, in the presence of lithium triethylmethylate, followed by a treatment in the presence of aqueous hydrogen peroxide solution in basic medium.

Once the CO function has been obtained, it is clear that derived functions (oxime, imine, alcohols) may be accessed via standard treatments within the scope of a person skilled in the art. For example, to go from the CO function to the C=NOH function, a treatment with hydroxylamine may be envisaged, whereas, in order to obtain a CHOH function, the CO function may be reduced using a reagent such as sodium borohydride.

Finally, a subject of the present invention is a process for preparing a particular polymer of formula (VII=) below:

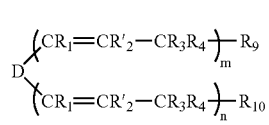

(VII')

as defined above, the said process comprising a step of reacting a cyclic boron compound of formula (7):

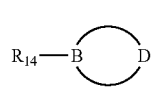

(7)

$R_{14}$ representing a group chosen from branched alkyl groups linked to the boron via a tertiary carbon containing from 4 to 20 carbon atoms, alkoxy groups containing from 1 to 20 carbon atoms or aryloxy groups containing from 6 to 20 carbon atoms, D having the same definition as that given above with at least one nucleophilic compound of ylide type of formula (2):

(2)

as defined above, in order to obtain a derivative of formula (XVI):

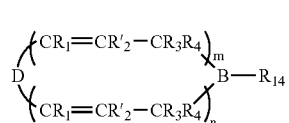

(XVI)

followed by a step of converting the group $BR_{14}$ into suitable groups $R_9$ and $R_{10}$.

Thus, this process corresponds to the preparation of a polymer in accordance with the present invention from a cyclic boron compound. During this process, expansion of the boron-based ring takes place, via 1,2 migration of the C—B bonds of the ring, whereas $R_{14}$ is incapable of undergoing this migration.

In order to make the description clearer, this process will now be described by means of the following reaction mechanism:

in a first stage, the cyclic boron compound (7) reacts with the allylic nucleophilic compound (2), leading to a complex (8), which spontaneously rearranges, via 1,2 migration of a carbon-boron bond of the cyclic compound, to give compound (9) according to the following scheme:

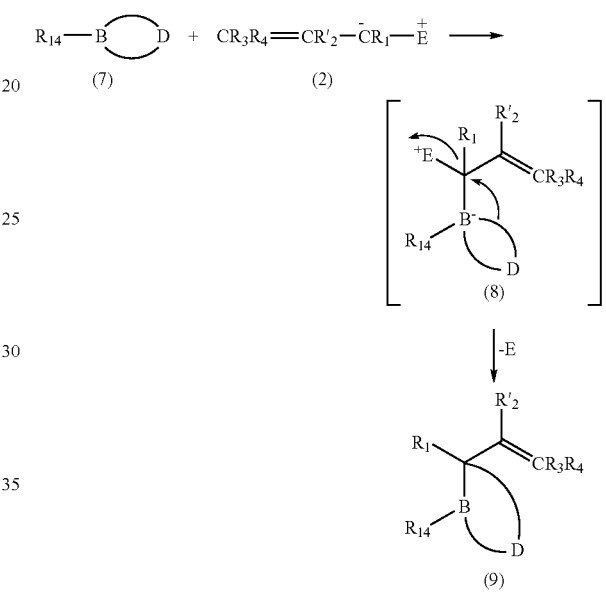

in a second stage, compound (9) rearranges via a mechanism of 1,3-sigmatropic rearrangement according to the following scheme:

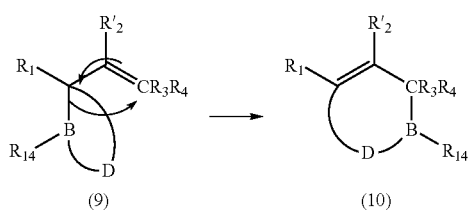

Compound (10) obtained during this second step can participate in a new polymerization step to give, after reaction with several equivalents of ylides, the polymer of formula (XIV) below:

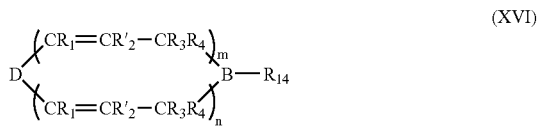

(XVI)

Next, a final step consists in converting the group B—$R_{14}$ into suitable groups —$R_9$ and $R_{10}$.

The reactions that may be envisaged for conversion of the group $R_{14}$ are similar to those envisaged for conversion of the group $BR_{11}R_{12}$ into a group $R_6$.

An example that may be mentioned, as a cyclic boron compound in accordance with the definition of compound (7), is the B-thexylborepane of formula:

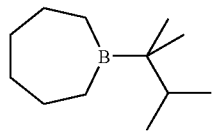

for which the thexyl group —$C(CH_3)_2$—$CH(CH_3)_2$ is incapable of migrating according to a 1,2 migration ("non-labile" group), and as such the unit —($CR_1$=$CR_2$—$CR_3R_4$)— will become inserted into the ring to give a cyclic intermediate.

When the process includes B-thexylborepane as boron compound and, as allylic nucleophilic compound of ylide type, the methallyltriphenylarsonium ylide for which E corresponds to the $Ph_3As$ group, and when this reaction is followed by a step of conversion via the action of aqueous hydrogen peroxide solution in basic medium, the polymer of formula (XI) defined above is obtained. When the step of conversion consists of a carbonylation step, the polymer obtained is the polymer of formula (IX) defined above. This step of conversion to a ketone consists, for example, in treating the boron-based polymer (XVI) with sodium cyanide followed by trifluoroacetic anhydride and then with aqueous hydrogen peroxide solution in basic medium.

The polymers according to the invention are particularly advantageous, since they may find an application in numerous sectors.

Thus, they may be used for the manufacture of fibres, resins or films, the manufacture of articles requiring relatively rigid materials, for example for the manufacture of plugging seals, sheaths or coatings for insulating conductive materials.

The polymers comprising polar functions may be used, for example, for making glues or adhesives.

The invention will now be described relative to the examples that follow, which are given as non-limiting illustrations.

EXAMPLE 1

Example 1 presents an example of preparation of a linear polymer included in the context of the definition of the polymers of formula (VII) with $R_1$, $R_3$ and $R_4$ representing H, $R_2$ represents —$CH_3$, $R_9$ and $R_{10}$ represent —OH and D represents —$(CH_2)_6$—.

The reaction scheme is as follows:

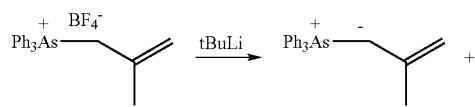

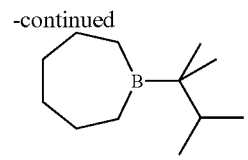

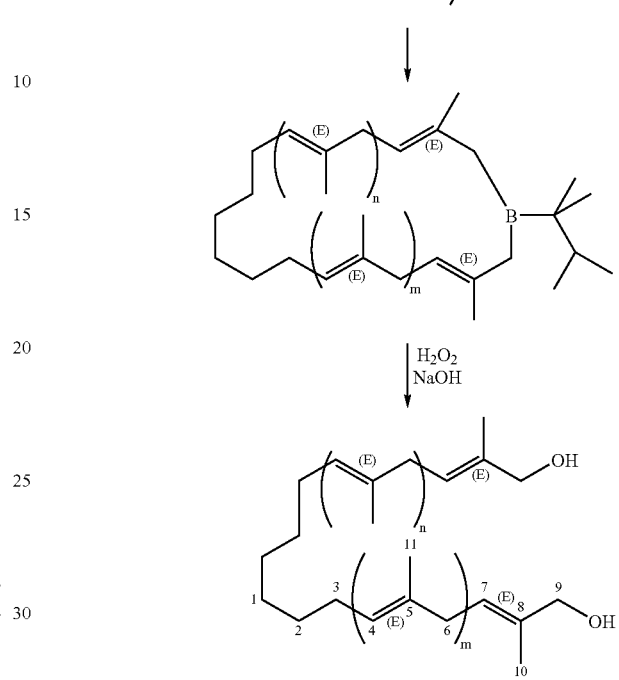

The protocol for preparing this type of polymer is as follows:

1.33 mL (2 mmol, 10 eq.) of a tert-butyl lithium solution (1.5 M in pentane) are added dropwise to a suspension of 0.896 g (2 mmol, 10 eq.) of methallyltriphenylarsonium tetrafluoroborate in 15 mL of anhydrous THF under an argon atmosphere, cooled to −78° C. The solution immediately turns orange and becomes clear. Stirring is continued at this temperature for 30 minutes and the mixture is then placed in an ice bath. The temperature is allowed to stabilize (15 minutes) and a solution of 38.4 mg (0.2 mmol, 1 eq.) of cyclic borane in 1 mL of anhydrous THF is then added. The solution decolourizes over 1 hour. 3 mL of 30% hydrogen peroxide and 3 mL of 3N sodium hydroxide are then added. The mixture returns to room temperature and stirring is continued for 4 hours, 30 mL of saturated ammonium chloride solution are then added and the mixture is extracted with 3 times 70 mL of dichloromethane. The organic phase is dried over magnesium sulfate and then filtered and evaporated. A white solid is obtained. This crude mixture is adsorbed onto silica and then placed on a column of silica gel and eluted with a 2/5/3 hexane/ether/dichloromethane mixture to give a colourless oil. A white solid forms after addition of 50 mL of methanol. The suspension is filtered and the solid is washed with twice 20 mL of methanol and then dried under vacuum. The polymer is recovered in the form of a white solid (112 mg, yield=81%).

$^1$H NMR (CDCl$_3$, δ in ppm): 5.17-5.12 (br t, 283 H, H4), 4.01 (s, 2H, H9), 2.69-2.67 (br d, 604H, H6), 1.66-1.58 (br s, 921H, H10-H10).

$^{13}$C NMR (CDCl$_3$, δ in ppm): 136.11-135.34 (br s, C5), 122.40-121.88 (br s, C4), 38.58-32.03 (br s, C6), 16.48-16.22 (br s, C11).

The polymer obtained is also analysed by stearic exclusion chromatography.

The analysis conditions are as follows:
type of column: PL gel 100+1000
Eluent: THF
pump flow rate: 1.00 mL/minute The sample to be analysed has a concentration of 1.45 mg/mL, with a refractive index increment dn/dc set at 0.130 mL/g.

The results of the measurements by LALLS (little-angle laser light scattering) are as follows:

| | |
|---|---|
| Degree of polymerization | Dp = 424 = n + m |
| Number-average molar mass | Mn = 23040 g/mol |
| Weight-average molar mass | Mw = 33750 g/mol |
| Polydispersity index | DPI = Mw/Mn = 1.46 |

Under the same operating conditions as those mentioned above, 0.896 g (2 mmol, 50 eq.) of arsonium salt react with 7.7 mg (0.04 mmol, 1 eq.) of cyclic borane to give after oxidation a polymer of the same structure (83 mg, yield=74%).

The polymer obtained is also analysed by stearic exclusion chromatography.

The analysis conditions are as follows:
Type of column: PL gel 100+1000
Eluent: THF
Pump flow rate: 1.00 mL/minutes The sample to be analysed has a concentration of 1.66 mg/mL, with a dn/dc set at 0.130 mL/g.

The results of the LALLS measurements are as follows:
DP=490
Mn=26470 g/mol
Mw=39600 g/mol
DPI=Mw/Mn=1.50.

EXAMPLE 2

Example 2 presents the case of a cyclic polymer falling within the context of the family of polymers of formula (VII), with $R_9$ and $R_{10}$ together forming a —(C=O)— group, D an alkylene —$(CH_2)_6$—, $R_1$, $R_3$ and $R_4$ represent H, and $R_2$ represents —$CH_3$.

The reaction scheme is as follows:

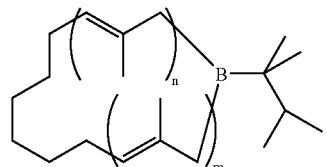

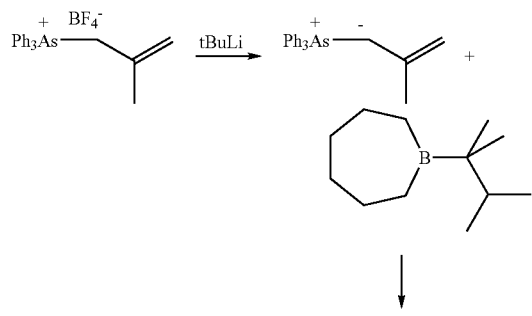

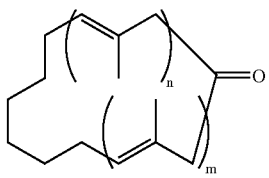

1.33 mL (2 mmol, 10 eq.) of tert-butyl lithium (1.5M in pentane) are added dropwise to a suspension of 0.896 g (2 mmol, 10 eq.) of methallyltriphenylarsonium tetrafluoroborate in 15 mL of anhydrous THF under an argon atmosphere, cooled to −78° C. The solution immediately turns orange and becomes clear. Stirring is continued at this temperature for 30 minutes and the mixture is then placed in an ice bath. The temperature stabilizes at 0° C. (15 minutes) and a solution of 38.4 mg (0.2 mmol, 1 eq.) of cyclic borane in 1 mL of anhydrous THF is then added. The solution decolourizes over 1 hour. The mixture is then placed at room temperature, and 20 mg (0.4 mmol, 2 eq.) of NaCN are then added. The mixture is then stirred vigorously at room temperature for 2 hours. The solution turns slightly yellow. The temperature is then reduced to −78° C. and 62 μL (0.44 mmol, 2.2 eq.) of trifluoroacetic anhydride are added. A precipitate appears. The temperature is maintained at −78° C. for 10 minutes and the mixture is then placed at room temperature. Stirring is continued for 5 hours, and 3 mL of 30% hydrogen peroxide and 3 mL of a 3N sodium acetate solution are then added. The mixture is stirred for 5 hours and is then extracted with 3 times 50 mL of dichloromethane. The organic phases are combined and washed with 20 mL of 1N hydrochloric acid. The solution is dried over magnesium sulfate and filtered, and the solvents are evaporated off. The crude product is adsorbed onto silica, placed on a column of silica gel and then eluted with a 3/6/1 hexane/ether/dichloromethane mixture. A colourless oil is thus recovered, which converts into a white solid after addition of 20 mL of methanol. The polymer is then washed with twice 10 mL of methanol and is isolated in the form of a white solid (56 mg, 43%).

Molar mass of the (2-methyl)prop-1-enylidene unit: 54 g/mol.
Molar mass of the cyclohexanone unit: 112 g/mol
Molar mass of the polymer: (112+(n+m)54) g/mol The polymer obtained is also analysed by stearic exclusion chromatography.

The analysis conditions are as follows:
Type of column: PL gel 100+1000
Eluent: THF
Pump flow rate: 1.00 mL/minute The sample to be analysed has a concentration of 1.82 mg/mL, with dn/dc set at 0.130 mL/g.

The results of the LALLS measurements are as follows:
Dp=481
Mn=26050 g/mol
Mw=35730 g/mol DPI=Mw/Mn=1.37.

EXAMPLE 3

Example 3 presents an example of preparation of a linear polymer included in the context of the definition of the polymers of formula (II) with $R_1$, $R_3$ and $R_4$ representing H, $R_2$ representing —$CH_3$, $R_5$ representing $CH_3$—$(CH_2)_3$— (denoted as Bu), and $R_6$ representing —OH.

The reaction scheme is as follows:

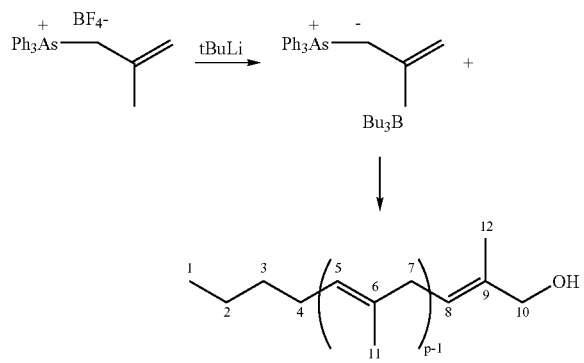

1.2 mL (1.8 mmol, 9 eq.) of a solution of tert-butyl lithium (1.5M in pentane) are added dropwise to a suspension of 0.806 g (1.8 mmol, 9 eq.) of methallyltriphenylarsonium tetrafluoroborate in 15 mL of anhydrous THF, under an argon atmosphere, cooled to −78° C. The solution turns bright orange and clear. Stirring is continued for 30 minutes at −78° C. and then for 15 minutes at 0° C. A solution containing 0.2 mL (0.2 mmol, 1 eq.) of tributylborane (1M in THF) in 2 mL of anhydrous THF is cooled in an ice bath, and then added dropwise. Total decoloration takes place 10 minutes after the end of the addition. 3 mL of 30% hydrogen peroxide and then 2 mL of 3N sodium hydroxide are added. The mixture is stirred for 4 hours at room temperature. 30 mL of saturated ammonium chloride solution are added and the reaction medium is then extracted with 3 times 50 mL of dichloromethane. The organic phase is dried over magnesium sulfate and then filtered and evaporated. The crude mixture is adsorbed onto silica and the product is placed on a column of silica gel and then eluted with an 8/2 hexane/ether mixture. The polymer is obtained in the form of a colourless oil (125 mg, yield=89%).

Molar mass of the (2-methyl)prop-1-enylidene unit: 54 g/mol.
Molar mass of the hexanol unit: 74 g/mol
Molar mass of the polymer: (74+p54) g/mol.
The average degree of polymerization determined by NMR is DP=p+1=12.

$^1$H NMR (CDCl$_3$, δ in ppm): 5.45-5.40 (br t, 1H, H8), 5.17-5.12 (t app, 11.2 H, H5), 4.13 (s, 0.3 H, H10), 4.02 (s, 1.7H, H10'), 2.74-2.64 (m, 25H, H7), 2.00-1.96 (m, 2H, H4), 1.68-1.66 (m, 3H, H12), 1.60-1.56 (m, 33.9 H, H11) 1.33-1.21 (m, 4.6H, H2-H3), 0.90-0.81 (m, 3H, H1).

$^{13}$C NMR (CDCl$_3$, δ in ppm): 135.91-135.26 (m), 135.14, 135.43, 124.69, 124.34, 123.08-122.43 (m), 69.08, 38.35-37.66 (m), 31.27, 30.75, 30.46, 29.84, 27.77, 23.60, 16.25, 13.77.

Under the same operating conditions, starting with 896 mg (2 mmol, 20 eq.) of the same arsonium salt and 0.1 mL (0.1 mmol, 1 eq.) of tributylborane, and after oxidation, a polymer of the same structure is obtained (93 mg, 81%).

$^1$H NMR (CDCl$_3$, δ in ppm): 5.42 (m, 1H, H8), 5.1-5.12 (t app, 25.3 H, H5), 4.13 (s, 0.2 H, H10), 4.01 (s, 1.8H, H10'), 2.74-2.64 (m, 58H, H7), 1.99-1.94 (m, 2H, H4), 1.68-1.66 (m, 5H, H12), 1.60-1.56 (m, 91 H, H11) 1.33-1.21 (m, 4.6H, H2-H3), 0.90-0.81 (m, 3H, H1).

The average degree of polymerization determined by NMR is DP=26.

The invention claimed is:

1. Process for preparing a polymer whose skeleton comprises a sequence of units of formula (I'):

in which:
$R_1$ represents a hydrogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;
$R'_2$ represents a hydrogen or halogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;
the radicals $R_3$ and $R_4$, which may be identical or different, correspond to the same definition as $R_1$, on condition that at least one of the radicals $R_3$ and $R_4$ represents, in each unit, a hydrogen atom;
the said radicals $R_1$, $R'_2$, $R_3$ and $R_4$ possibly comprising, when they represent a hydrocarbon-based group, one or more substituents chosen from halogen groups, alkyl groups of 1 to 20 carbon atoms, alkoxy groups of 1 to 20 carbon atoms, aryl groups of 6 to 20 carbon atoms, aryloxy groups of 6 to 20 carbon atoms and amino groups,
the said process comprising a step consisting in reacting, in suitable amount:
at least one ylide compound corresponding to formula (2) below:

in which the radicals $R_1$, $R'_2$, $R_3$ and $R_4$ correspond to the same definition as that given above, E being a leaving group, with a trivalent boron compound, comprising at least one group capable of migrating, so as to obtain the said sequence of units of formula (I') as defined above.

2. Process according to claim 1, in which the group capable of migrating is a group chosen from linear or branched alkyl groups containing from 1 to 20 carbon atoms, with the exception of branched alkyl groups linked to boron via a tertiary carbon.

3. Process according to claim 1, in which the leaving group E is chosen from $N_2$, $S(R)_2$, $S(O)(R)_2$, $N(R)_3$, $AsAr_3$ and $PAr_3$, in which Ar represents a phenyl group optionally substituted with methyl or methoxy groups and R is an alkyl group.

4. Process according to claim 1, in which the ylide compound is methallyltriphenylarsonium ylide.

5. Process for preparing a polymer corresponding to formula (II') below:

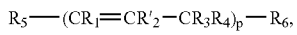
$$R_5\text{—}(CR_1\!\!=\!\!CR'_2\text{—}CR_3R_4)_p\text{—}R_6, \quad (II')$$

wherein:
- $R_1$ represents a hydrogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;
- $R'_2$ represents a hydrogen or halogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;
- the radicals $R_3$ and $R_4$, which may be identical or different, correspond to the same definition as $R_1$, on condition that at least one of the radicals $R_3$ and $R_4$ represents, in each unit, a hydrogen atom;

the said radicals $R_1$, $R'_2$, $R_3$ and $R_4$ possibly comprising, when they represent a hydrocarbon-based group, one or more substituents chosen from halogen groups, alkyl groups of 1 to 20 carbon atoms, alkoxy groups of 1 to 20 carbon atoms, aryl groups of 6 to 20 carbon atoms, aryloxy groups of 6 to 20 carbon atoms and amino groups, and $R_5$, $R_6$ and p wherein $R_5$ represents a linear or branched alkyl group containing from 1 to 20 carbon atoms, a cycloalkyl group containing from 3 to 20 carbon atoms or an aryl group containing from 6 to 20 carbon atoms, $R_6$ represents an —OH, primary amine, thiol —SH, halogen or —CHO group, a group derived from —CHO, an ester group, an optionally substituted amide group or an azide group —$N_3$, and p is an integer ranging from 4 to 10 000, the said process comprising a step of reacting, in suitable amount:

- a boron compound of formula (1) $R_5$—$BR_{11}R_{12}$ with $R_5$ having the same definition as above and representing the group capable of migrating, $R_{11}$ and $R_{12}$, which may be identical or different, possibly:
  - representing a branched alkyl group linked to the boron via a tertiary carbon containing from 4 to 20 carbon atoms, an alkoxy group containing from 1 to 20 carbon atoms or an aryloxy group containing from 1 to 20 carbon atoms; or
  - together forming a group —O—X—O—, in which X is a linear or branched alkylenediyl group containing from 2 to 6 carbon atoms with at least one allylic nucleophilic ylide compound of formula (2) as defined below,

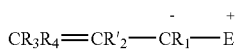
$$CR_3R_4\!\!=\!\!CR'_2\text{—}CR_1^-\text{—}E^+ \quad (2)$$

E being a leaving group, by means of which an intermediate of formula (XII) below is obtained:

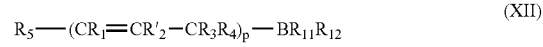
$$R_5\text{—}(CR_1\!\!=\!\!CR'_2\text{—}CR_3R_4)_p\text{—}BR_{11}R_{12} \quad (XII)$$

the said process also comprising a step of converting the boron-based group into a suitable group $R_6$, by means of which the polymer of formula (II') defined above is obtained.

6. Process for preparing a polymer corresponding to formula (II') below:

$$R_5\text{—}(CR_1\!\!=\!\!CR'_2\text{—}CR_3R_4)_p\text{—}R_6, \quad (II')$$

wherein:
- $R_1$ represents a hydrogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;
- $R'_2$ represents a hydrogen or halogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;
- the radicals $R_3$ and $R_4$, which may be identical or different, correspond to the same definition as $R_1$, on condition that at least one of the radicals $R_3$ and $R_4$ represents, in each unit, a hydrogen atom;

the said radicals $R_1$, $R'_2$, $R_3$ and $R_4$ possibly comprising, when they represent a hydrocarbon-based group, one or more substituents chosen from halogen groups, alkyl groups of 1 to 20 carbon atoms, alkoxy groups of 1 to 20 carbon atoms, aryl groups of 6 to 20 carbon atoms, aryloxy groups of 6 to 20 carbon atoms and amino groups, and $R_5$, $R_6$ and p wherein $R_5$ represents a linear or branched alkyl group containing from 1 to 20 carbon atoms, a cycloalkyl group containing from 3 to 20 carbon atoms or an aryl group containing from 6 to 20 carbon atoms, $R_6$ represents an —OH, primary amine, thiol —SH, halogen or —CHO group, a group derived from —CHO, an ester group, an optionally substituted amide group or an azide group —$N_3$, and p is an integer ranging from 4 to 10 000, the said process comprising a step of reacting, in suitable amount, a boron compound of formula $(R_5)_3$—B with $R_5$ having the same definition as that given above, with at least one allylic nucleophilic ylide compound of formula (2) as defined below,

$$CR_3R_4\!\!=\!\!CR'_2\text{—}CR_1^-\text{—}E^+ \quad (2)$$

E being a leaving group, by means of which an intermediate of formula (XIII) below is obtained:

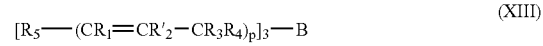
$$[R_5\text{—}(CR_1\!\!=\!\!CR'_2\text{—}CR_3R_4)_p]_3\text{—}B \quad (XIII)$$

the said process also comprising a step of converting the boron-based group into a suitable group $R_6$, by means of which the polymer of formula (II') defined above is obtained.

7. Process for preparing the polymer corresponding to the following formula:

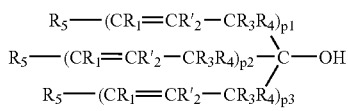

the radicals $R_5$, which may be identical or different, wherein $R_5$ represents a linear or branched alkyl group containing from 1 to 20 carbon atoms, a cycloalkyl group containing from 3 to 20 carbon atoms or an aryl group containing from 6 to 20 carbon atoms, $R_1$, $R'_2$, $R_3$ and $R_4$ being defined as follows:

$R_1$ represents a hydrogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;

$R'_2$ represents a hydrogen or halogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;

the radicals $R_3$ and $R_4$, which may be identical or different, correspond to the same definition as $R_1$, on condition that at least one of the radicals $R_3$ and $R_4$ represents, in each unit, a hydrogen atom;

the said radicals $R_1$, $R'_2$, $R_3$ and $R_4$ possibly comprising, when they represent a hydrocarbon-based group, one or more substituents chosen from halogen groups, alkyl groups of 1 to 20 carbon atoms, alkoxy groups of 1 to 20 carbon atoms, aryl groups of 6 to 20 carbon atoms, aryloxy groups of 6 to 20 carbon atoms and amino groups, and $p_1$, $p_2$ and $p_3$, which may be identical or different, being integers ranging from 2 to 5000, the said process comprising a step of reacting, in suitable amount, a boron compound of formula $(R_5)_3$—B with at least one allylic nucleophilic ylide compound of formula (2) as defined below,

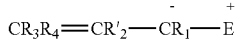

(2)

E being a leaving group, by means of which an intermediate of formula (XIV) below is obtained:

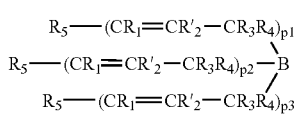

(XIV)

the said process also comprising a step of converting the boron-based group into a C—OH group by treatment of the intermediate compound (XIV) by heating in the presence of carbon monoxide, followed by a treatment with aqueous hydrogen peroxide solution in basic medium.

8. Process for preparing a polymer of formula (IV') below:

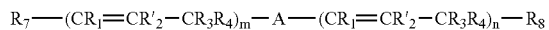

(IV')

with $R_1$, $R'_2$, $R_3$ and $R_4$ defined as follows, $R_1$ represents a hydrogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;

$R'_2$ represents a hydrogen or halogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;

the radicals $R_3$ and $R_4$, which may be identical or different, correspond to the same definition as $R_1$, on condition that at least one of the radicals $R_3$ and $R_4$ represents, in each unit, a hydrogen atom;

the said radicals $R_1$, $R'_2$, $R_3$ and $R_4$ possibly comprising, when they represent a hydrocarbon-based group, one or more substituents chosen from halogen groups, alkyl groups of 1 to 20 carbon atoms, alkoxy groups of 1 to 20 carbon atoms, aryl groups of 6 to 20 carbon atoms, aryloxy groups of 6 to 20 carbon atoms and amino groups, and $R_7$, $R_8$, A, m and n wherein A represents a C=O group, a CO derivative or —CHOH group, and the radicals $R_7$ and $R_8$, which may be identical or different, represent a linear or branched alkyl group containing from 1 to 20 carbon atoms, a cycloalkyl group containing from 3 to 20 carbon atoms or an aryl group containing from 6 to 20 carbon atoms, m is an integer ranging from 2 to 5000 and n is an integer ranging from 2 to 5000, the said process comprising the reaction of a boron compound of formula (6) $R_7$—$BR_8R_{13}$ with $R_7$ and $R_8$ having the same definition as that given above, $R_{13}$ being a branched alkyl group linked to the boron via a tertiary carbon containing from 4 to 20 carbon atoms, or an alkoxy or aryloxy group containing from 1 to 20 carbon atoms, with at least one allylic nucleophilic ylide compound of formula (2):

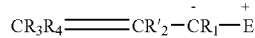

(2)

E being a leaving group, by means of which a derivative of formula (XV) is obtained:

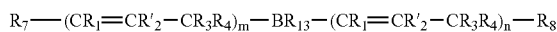

(XV)

followed by a reaction for conversion of the group $BR_{13}$ into a suitable group A.

9. Process for preparing a polymer of formula (VII') below:

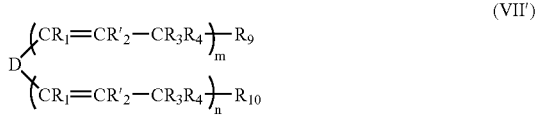

(VII')

with the radicals $R_1$, $R'_2$, $R_3$ and $R_4$ defined as follows:
- $R_1$ represents a hydrogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;
- $R'_2$ represents a hydrogen or halogen atom or a hydrocarbon-based group chosen from linear or branched alkyl groups containing from 1 to 20 carbon atoms, cycloalkyl groups containing from 3 to 8 carbon atoms, alkoxy groups containing from 1 to 20 carbon atoms, aryl groups containing from 6 to 20 carbon atoms and aryloxy groups containing from 6 to 20 carbon atoms;
- the radicals $R_3$ and $R_4$, which may be identical or different, correspond to the same definition as $R_1$, on condition that at least one of the radicals $R_3$ and $R_4$ represents, in each unit, a hydrogen atom;
- the said radicals $R_1$, $R'_2$, $R_3$ and $R_4$ possibly comprising, when they represent a hydrocarbon-based group, one or more substituents chosen from halogen groups, alkyl groups of 1 to 20 carbon atoms, alkoxy groups of 1 to 20 carbon atoms, aryl groups of 6 to 20 carbon atoms, aryloxy groups of 6 to 20 carbon atoms and amino groups,
- $R_9$, $R_{10}$, D, m and n wherein the radicals $R_9$ and $R_{10}$, which may be identical or different, represent an OH, $NH_2$, SH, optionally substituted amide or —CHO group, a group derived from —CHO, an ester group, an optionally substituted amide group or an azide group —$N_3$;
  - or $R_9$ and $R_{10}$ together form a —C(=O)— group, a group derived from CO or a —CHOH— group;
- D represents a linear or branched alkylenediyl group containing from 4 to 20 carbon atoms, possibly comprising in its chain one or more heteroatoms chosen from oxygen, sulfur and nitrogen, m is an integer ranging from 2 to 5000 and n is an integer ranging from 2 to 5000, the said process comprising a step of reacting a cyclic boron compound of formula (7):

(7)

$R_{14}$ representing a group chosen from branched alkyl groups linked to boron via a tertiary carbon containing from 4 to 20 carbon atoms, or alkoxy or aryloxy groups containing from 1 to 20 carbon atoms,
with at least one nucleophilic ylide compound of formula (2):

(2)

E being a leaving group, in order to obtain a derivative of formula (XVI):

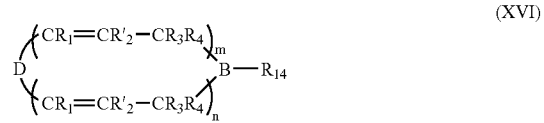

(XVI)

followed by a step of conversion of the group $BR_{14}$ into suitable groups $R_9$ and $R_{10}$.

10. Process according to claim 2, in which the leaving group E is chosen from $N_2$, $S(R)_2$, $S(O)(R)_2$, $N(R)_3$, $AsAr_3$ and $PAr_3$, in which Ar represents a phenyl group optionally substituted with methyl or methoxy groups and R is an alkyl group.

* * * * *

UNITED STATES PATENT AND TRADEMARK OFFICE
CERTIFICATE OF CORRECTION

PATENT NO. : 7,732,541 B2
APPLICATION NO. : 10/530802
DATED : June 8, 2010
INVENTOR(S) : Thierry Le Gall et al.

It is certified that error appears in the above-identified patent and that said Letters Patent is hereby corrected as shown below:

Claims 11 and 12 have been omitted in their entirety. Please insert claims 11 and 12 following claim 10, at col. 24, line 40, as follows:

--11. Process according to Claim 9, in which the cyclic boron compound is B-thexylborepane and the nucleophilic ylide compound is methallyltriphenylarsonium, by means of which a polymer of formula (XI) is obtained after a step of conversion via the action of aqueous hydrogen peroxide solution in basic medium, the polymer of formula (XI) being defined as:

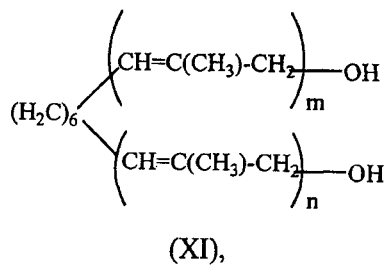

(XI), wherein m is an integer ranging from 2 to 5000 and n is an integer ranging from 2 to 5000.

12. Process according to Claim 9, in which the cyclic boron compound is B-thexylborepane and the nucleophilic ylide compound is methallyltriphenylarsonium, by means of which a polymer of formula (IX) is obtained after a carbonylation step of conversion, the polymer of formula (IX) being defined as:

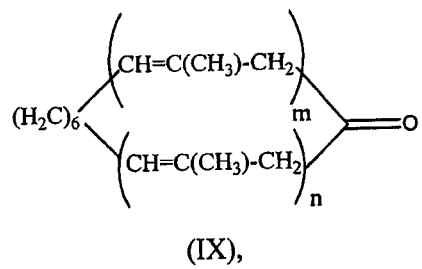

(IX), wherein m is an integer ranging from 2 to 5000 and n is an integer ranging from 2 to 5000.--

Signed and Sealed this
Twenty-eighth Day of August, 2012

David J. Kappos
*Director of the United States Patent and Trademark Office*